(12) United States Patent
Naito et al.

(10) Patent No.: US 11,225,930 B2
(45) Date of Patent: Jan. 18, 2022

(54) ENGINE

(71) Applicant: SUBARU CORPORATION, Tokyo (JP)

(72) Inventors: Tetsu Naito, Tokyo (JP); Shigeru Sakamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/899,126

(22) Filed: Jun. 11, 2020

(65) Prior Publication Data

US 2021/0095615 A1  Apr. 1, 2021

(30) Foreign Application Priority Data

Sep. 27, 2019  (JP) .............................. JP2019-177046

(51) Int. Cl.
*F02F 1/42* (2006.01)
*F02F 1/24* (2006.01)
*F02M 35/104* (2006.01)
*F02M 35/108* (2006.01)
*F02M 35/10* (2006.01)

(52) U.S. Cl.
CPC ............ *F02F 1/4235* (2013.01); *F02F 1/243* (2013.01); *F02M 35/108* (2013.01); *F02M 35/1047* (2013.01); *F02M 35/10255* (2013.01)

(58) Field of Classification Search
CPC ......................... F02M 35/108; F02M 35/10255
See application file for complete search history.

(56) References Cited

U.S. PATENT DOCUMENTS

| 4,519,350 A * | 5/1985 | Oda .................. F02M 35/10118 |
| | | 123/308 |
| 4,610,236 A * | 9/1986 | Okino .............. F02M 35/10045 |
| | | 123/432 |
| 6,918,372 B2 * | 7/2005 | Nishii ...................... F02B 31/08 |
| | | 123/306 |
| 7,802,555 B2 * | 9/2010 | Maeda .................. F02B 23/104 |
| | | 123/306 |
| 2002/0078921 A1 * | 6/2002 | Kim ........................ F02B 31/08 |
| | | 123/306 |

FOREIGN PATENT DOCUMENTS

| JP | 2007-113482 A | 5/2007 |
| JP | 2012-188980 A | 10/2012 |
| JP | 2017141761 A * | 8/2017 |
| JP | 2018-021512 A | 2/2018 |
| JP | 2018021512 A * | 2/2018 |

* cited by examiner

*Primary Examiner* — Kevin A Lathers
(74) *Attorney, Agent, or Firm* — McGinn IP Law Group, PLLC

(57) ABSTRACT

An engine includes a cylinder head, an intake manifold, and a partition wall. The cylinder head includes an intake port communicating with a combustion chamber. The intake manifold is fixed to the cylinder head and includes an intake passage communicating with the intake port. The partition wall that separates at least part of the intake port into a first channel and a second channel. The partition wall includes a partition wall member extending from the intake port to the intake passage and fixed to an inner wall of the intake port and an inner wall of the intake passage.

11 Claims, 7 Drawing Sheets

ENGINE

CROSS-REFERENCE TO RELATED APPLICATIONS

The present application claims priority from Japanese Patent Application No. 2019-177046 filed on Sep. 27, 2019, the entire contents of which are hereby incorporated by reference.

BACKGROUND

The technology relates to an engine provided with a partition wall that separates an intake port into two channels.

For internal combustion engines such as automobile engines, a technique is conventionally known which enhances a gas flow in a combustion chamber to improve combustion efficiency of fuel. For example, a method of generating a vortex flow called "tumble flow" or "swirl flow" and enhancing this vortex flow is known as such a method of enhancing a gas flow. The tumble flow is a swirling flow that swirls around an axis orthogonal to a central axis of a cylinder in an axial direction. The swirl flow is a swirling flow that swirls around the central axis of the cylinder in an axial direction.

The engine is generally provided with a cylinder head including an intake port and an intake manifold including an intake passage that communicates with the intake port. To generate a vortex flow and enhance the gas flow, the engine is provided with a partition wall member that separates at least one of the intake port or the intake passage into two channels and an intake control valve that controls a flow rate of the intake gas that passes through each of the two channels. When the flow rate of the intake gas is small, the intake control valve blocks the intake gas flowing into one of the two channels to thereby increase a flow speed of the intake gas that passes through the other channel of the two channels. This enhances the gas flow in the combustion chamber.

Japanese Unexamined Patent Application Publication No. 2018-021512 discloses an engine provided with a partition wall that extends from an intake channel of an intake manifold to an intake port of a cylinder head and partitions part of each of the intake channel and the intake port. A gasket is integrally provided in a partition wall. The gasket is sandwiched between the cylinder head and the intake manifold.

Japanese Unexamined Patent Application Publication No. 2012-188980 discloses an intake manifold provided with an intake pipe for which a partition wall for partitioning the intake pipe into two channels is provided over substantially the whole length. Japanese Unexamined Patent Application Publication No. 2007-113482 discloses a resin intake manifold for which a partition wall for partitioning an intake port into two regions is integrally provided.

SUMMARY

An aspect of the technology provides an engine. The engine includes a cylinder head, an intake manifold, and a partition wall. The cylinder head includes an intake port communicating with a combustion chamber. The intake manifold is fixed to the cylinder head and includes an intake passage communicating with the intake port. The partition wall separates at least part of the intake port into a first channel and a second channel. The partition wall includes a partition wall member extending from the intake port to the intake passage and fixed to an inner wall of the intake port and an inner wall of the intake passage.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

A description is given below of some embodiments of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following embodiments which are not recited in a most-generic independent claim of the disclosure are optional and may be provided on an as-needed basis. The drawings are schematic and are not intended to be drawn to scale.

An intake manifold is generally assembled to a cylinder head using bolts or the like. If the intake manifold is shifted from a desired position, a step is produced between an intake channel of the intake manifold and an intake port of the cylinder head, and as a result, an intake gas passing through the intake passage and the intake port is disturbed. Particularly when a partition wall for generating a vortex flow is provided, the vortex flow is disturbed and a gas flow within a combustion chamber becomes unstable.

To stabilize the gas flow in the combustion chamber, it is necessary to devise ways to reduce the step between the intake port and the intake passage and reduce a variation in the step for each engine. However, conventionally, such devices have not been fully examined.

It is desirable to provide an engine capable of reducing the step between the intake port and the intake passage and stabilizing the gas flow in the combustion chamber.

Figure 1:
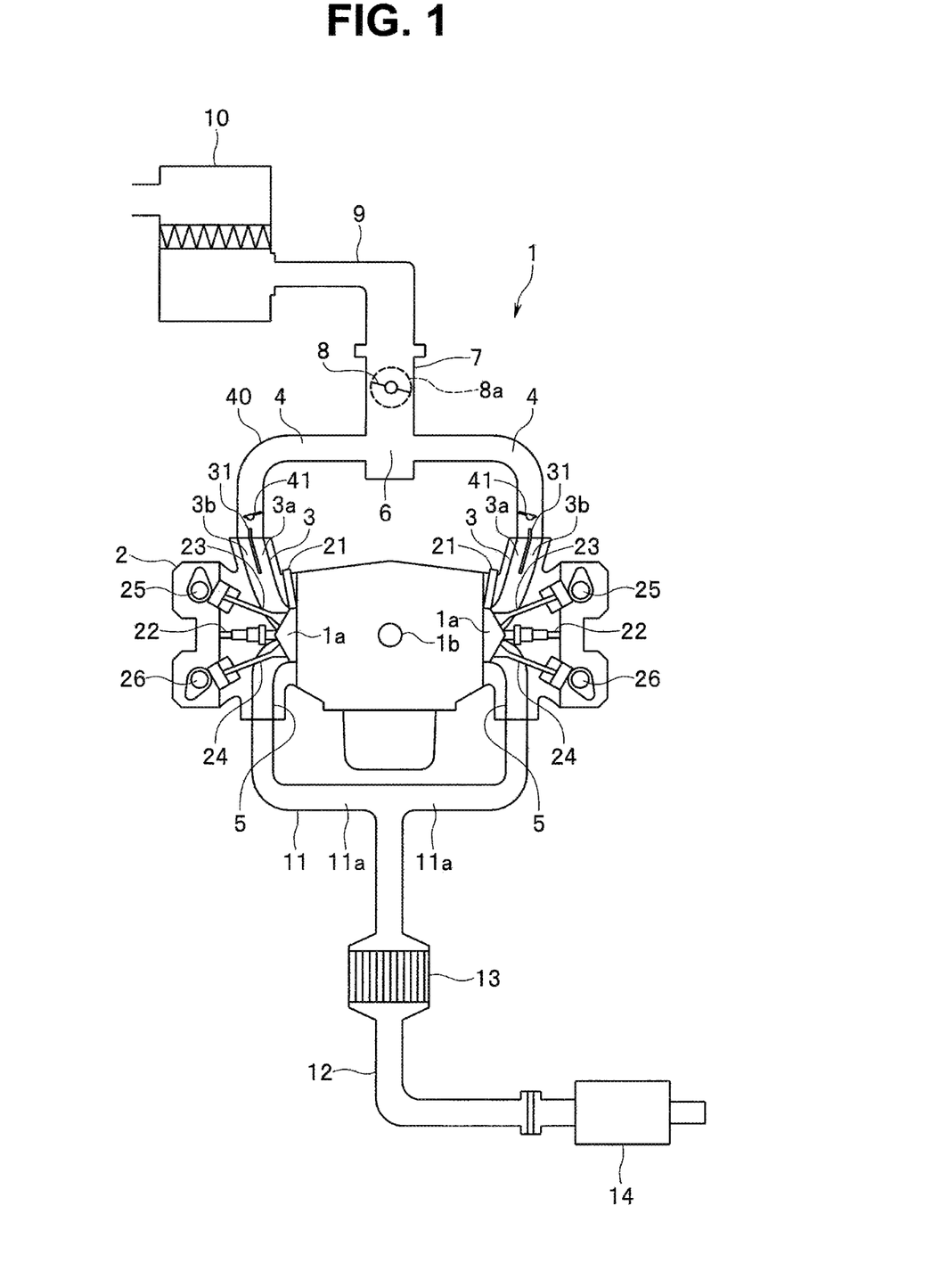
FIG. 1 is an explanatory diagram illustrating a schematic configuration of an engine according to an embodiment of the technology.

Hereinafter, an embodiment of the technology will be described with reference to the accompanying drawings. First, a schematic configuration of an engine 1 according to an embodiment of the technology will be described with reference to FIG. 1. The engine 1 illustrated in FIG. 1 is an automobile engine. In one embodiment the engine may be a horizontally opposed engine. One or more cylinders 1a are formed in each of a bank on the left of FIG. 1 (hereinafter referred to as "left bank") and a bank on the right of FIG. 1 (hereinafter referred to as "right bank"). In the engine 1, a cylinder 1a on the left bank and a cylinder 1a on the right bank are disposed horizontally across a crank shaft 1b.

The engine 1 is provided with cylinder heads 2 provided on both the left bank and the right bank. The cylinder head 2 includes an intake port 3 and an exhaust port 5 communicating with the interior of the cylinder 1a formed on the each bank, and more specifically, with a combustion chamber. The intake port 3 and the exhaust port 5 are provided for the each cylinder 1a.

The engine 1 is further provided with an intake manifold 40 fixed to both the cylinder head 2 on the left bank and the cylinder head 2 on the right bank. The intake manifold 40 includes a plurality of intake passages 4 through which an intake gas introduced into the cylinder 1a passes. Each of the plurality of intake passages 4 is located upstream of the corresponding intake port 3 (opposite to the cylinder 1a) and communicates with the intake port 3.

The engine 1 is further provided with an air chamber 6 provided upstream of the intake manifold 40, a throttle passage 7 provided upstream of the air chamber 6, an intake pipe 9 provided upstream of the throttle passage 7, and an air cleaner 10 provided upstream of the intake pipe 9. The plurality of intake passages 4 of the intake manifold 40 are collected to the air chamber 6. For example, an electronically controlled throttle valve 8, which is opened/closed by a throttle actuator 8a, is provided in the throttle passage 7.

The engine 1 is further provided with an exhaust manifold 11 fixed to both the cylinder head 2 on the left bank and the cylinder head 2 on the right bank. The exhaust manifold 11 includes a plurality of exhaust passages 11a through which an exhaust gas discharged from within the cylinder 1a passes. Each of the plurality of exhaust passages 11a is located downstream of the corresponding exhaust port 5 (opposite to the cylinder 1a) and communicates with the exhaust port 5.

The engine 1 is further provided with an exhaust pipe 12 provided downstream of the exhaust manifold 11, a catalyst 13 interposed in the exhaust pipe 12, and a muffler 14 provided downstream of the exhaust pipe 12. The plurality of exhaust passages 11a of the exhaust manifold 11 are collected to the exhaust pipe 12.

The engine 1 is further provided with a plurality of injectors 21 and a plurality of ignition plugs 22. Each of the plurality of injectors 21 injects fuel into the corresponding cylinder 1a. FIG. 1 illustrates an example of the engine 1 being constituted as a direct injection engine. In this example, the injector 21 is disposed such that a fuel injection hole thereof faces into the cylinder 1a. Each of the plurality of ignition plugs 22 is disposed such that an ignition part thereof is exposed in the corresponding cylinder 1a.

The engine 1 is further provided with a plurality of intake valves 23 and a plurality of exhaust valves 24. Each of the plurality of intake valves 23 is disposed in the corresponding intake port 3 to open and close the intake port 3. Each of the plurality of exhaust valves 24 is disposed in the corresponding exhaust port 5 to open and close the exhaust port 5.

The engine 1 is further provided with an intake cam shaft 25 and an exhaust cam shaft 26 provided on the left bank and the right bank respectively. The intake cam shaft 25 controls opening and closing operation of the plurality of intake valves 23 at predetermined timing. The exhaust cam shaft 26 controls opening and closing operation of the plurality of exhaust valves 24 at predetermined timing. The intake cam shaft 25 and the exhaust cam shaft 26 are synchronized with rotation of the crank shaft 1b, for example, via a timing belt (not illustrated). When the crank shaft 1b rotates one turn, the intake cam shaft 25 and the exhaust cam shaft 26 each rotate half turn.

Figure 3:
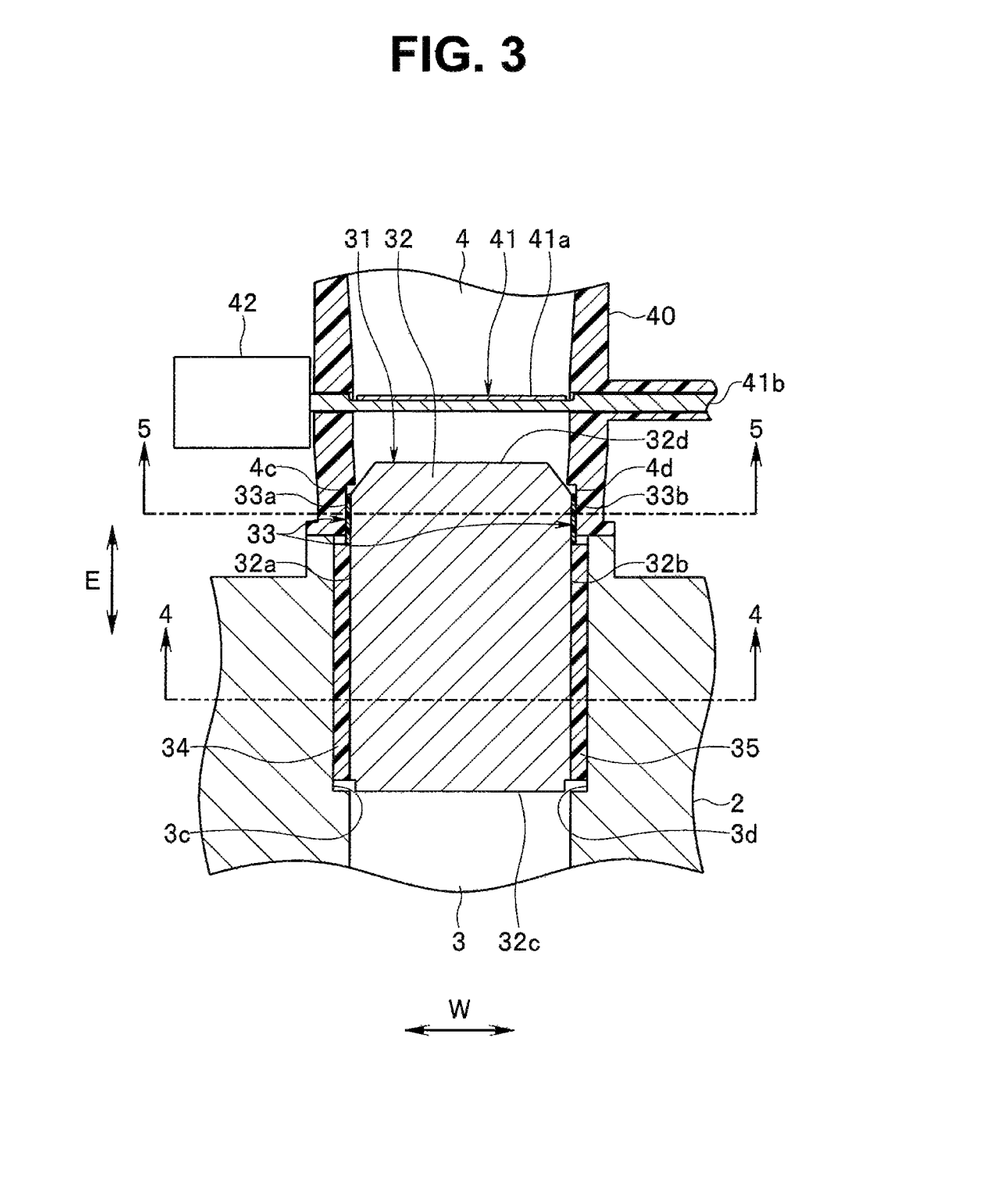
FIG. 3 is a cross-sectional view illustrating a cross section at a position indicated by a line 3-3 in FIG. 2.

The engine 1 is further provided with a mechanism for generating a vortex flow in the cylinder 1a. In one embodiment, the above-described vortex flow is a tumble flow. The engine 1 is provided with a plurality of partition walls 31, a plurality of intake control valves 41 and a plurality of motors 42 as mechanisms for generating a tumble flow. Note that the motor 42 is illustrated in FIG. 3, which will be described later. Each of the plurality of partition walls 31 separates at least part of the corresponding intake port 3 into a first channel 3a and a second channel 3b.

The intake control valve 41 is a control valve, called a "tumble generation valve (TGV)" or "tumble control valve (TCV)." Each of the plurality of intake control valves 41 is provided in the intake passage 4 of the intake manifold 40, located upstream of the corresponding partition wall 31 and controls the flow rate of the intake gas that passes through each of the first channel 3a and the second channel 3b of the corresponding intake port 3. The motor 42 causes the intake control valve 41 to rotate so that the flow rate of the intake gas is controlled.

Figure 2:
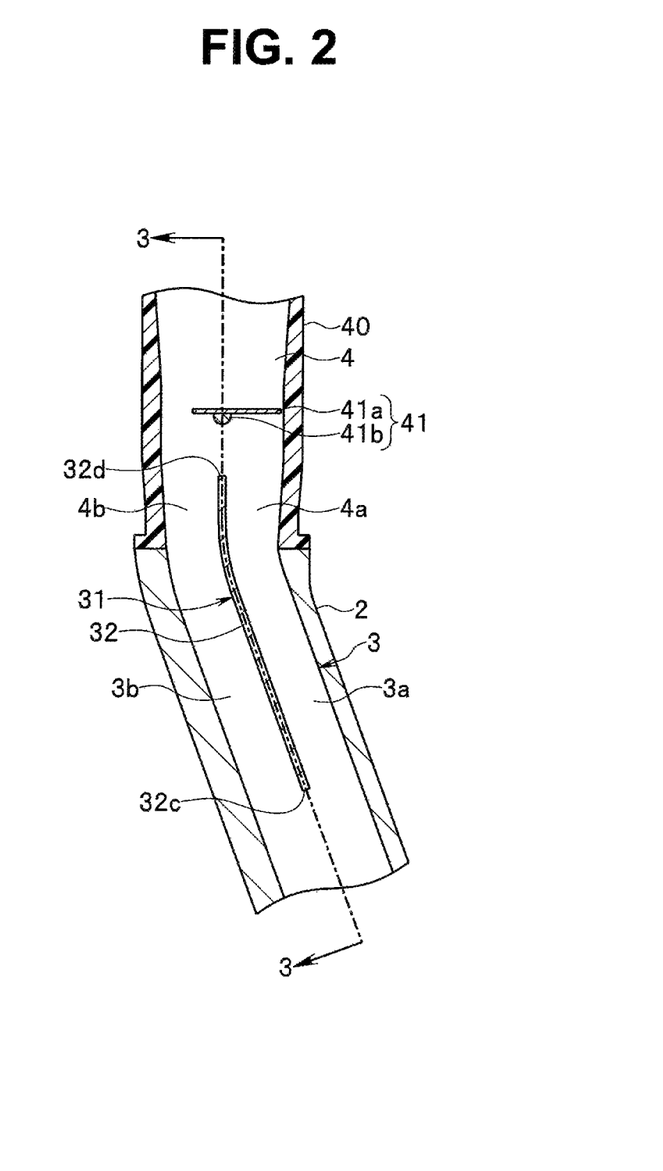
FIG. 2 is a cross-sectional view illustrating a cross section of part of the engine according to the embodiment of the technology.
Figure 4:
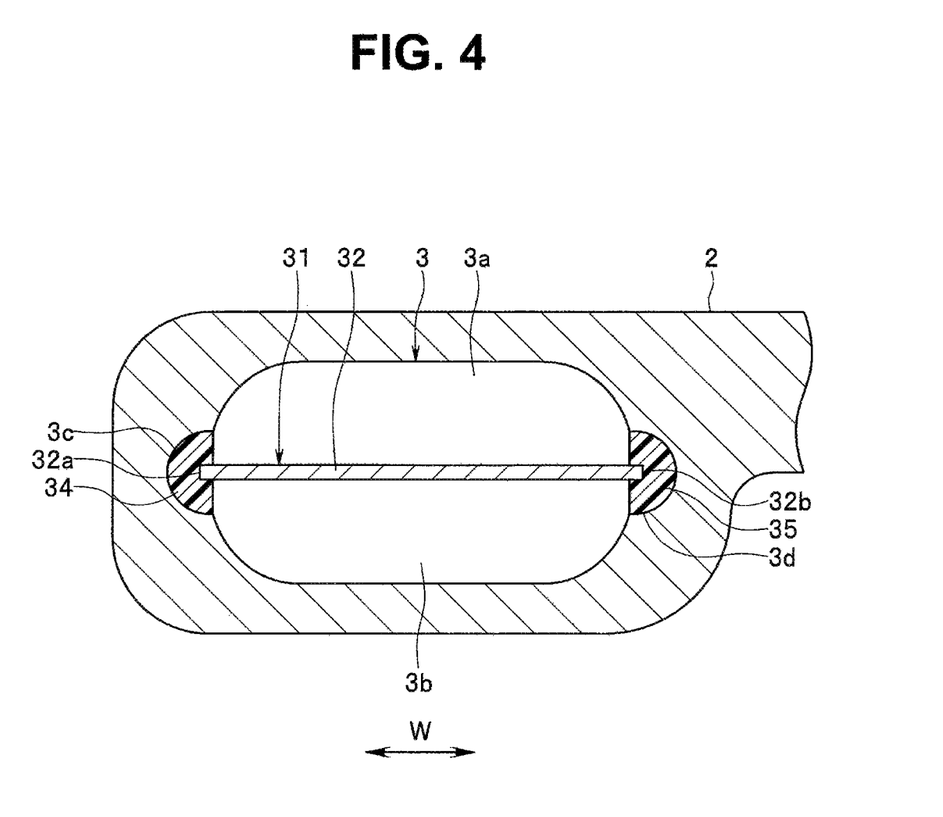
FIG. 4 is a cross-sectional view illustrating part of a cross section at a position indicated by a line 4-4 in FIG. 3.
Figure 5:
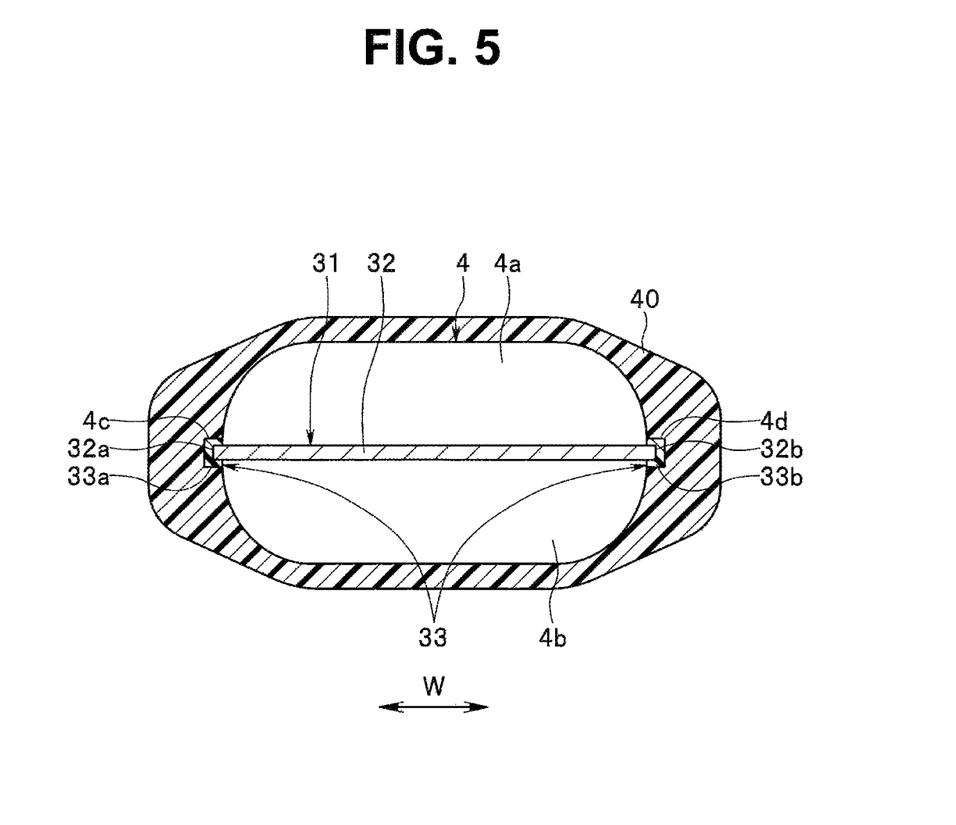
FIG. 5 is a cross-sectional view illustrating a cross section at a position indicated by a line 5-5 in FIG. 3.

Next, a configuration of the partition wall 31 will be described with reference to FIG. 2 to FIG. 5. FIG. 2 is a cross-sectional view illustrating part of the engine 1, more specifically, a part in the vicinity of a boundary between the intake port 3 and the intake passage 4. FIG. 3 is a cross-sectional view illustrating a cross section at a position indicated by a line 3-3 in FIG. 2. FIG. 4 is a cross-sectional view illustrating part of a cross section at a position indicated by a line 4-4 in FIG. 3. FIG. 5 is a cross-sectional view illustrating a cross section at a position indicated by a line 5-5 in FIG. 3.

As illustrated in FIG. 2 to FIG. 5, the partition wall 31 includes a plate-like partition wall member 32, which is a main body. The partition wall member 32 is formed of a metal material, for example, aluminum. As illustrated in FIG. 2, the partition wall member 32 extends from the intake port 3 to the intake passage 4, separates at least part of the intake port 3 into the first channel 3a and the second channel 3b, and separates part of the intake passage 4 into a third channel 4a and a fourth channel 4b. The first channel 3a is continuous to the third channel 4a. The second channel 3b is continuous to the fourth channel 4b.

In the present embodiment, the intake port 3 in particular has such a shape that part of the vicinity of the intake passage 4 is curved. The partition wall member 32 has such a shape that part of the partition wall member 32 is curved along the curved shape of the intake port 3. Note that the line 3-3 in FIG. 2 is also a curve where part of the line is curved along the curved shape of the intake port 3.

Here, a direction in which the partition wall member 32 extends from the intake port 3 to the intake passage 4 is called an "extending direction" and represented by a symbol E. In FIG. 3, the extending direction E is represented by an arrow with the symbol E. A direction orthogonal to the extending direction E is called a "width direction" and is represented by a symbol W. In FIG. 3 to FIG. 5, the width direction W is represented by an arrow with the symbol W. The extending direction E is also a direction in which the intake port 3 and the intake passage 4 extend in the vicinity of the partition wall member 32. The width direction W is also a direction orthogonal to the direction in which the intake port 3 and the intake passage 4 extend in the vicinity of the partition wall member 32. As illustrated in FIG. 3 to FIG. 5, the partition wall member 32 includes a first end portion 32a and a second end portion 32b located at both ends in the width direction W, a bottom end portion 32c located at one end downstream in the extending direction E (cylinder 1a side) and a top end portion 32d located at one end upstream in the extending direction E.

As illustrated in FIG. 3, the partition wall member 32 is fixed to an inner wall of the intake port 3 and an inner wall of the intake passage 4. Hereinafter, a method of fixing the partition wall member 32 will be described. As illustrated in FIG. 3 and FIG. 4, the partition wall 31 further includes a first guide member 34 provided at the first end portion 32a of the partition wall member 32 and a second guide member 35 provided at the second end portion 32b of the partition wall member 32. The first and second guide members 34 and 35 are formed, for example, of a resin material.

Both the first and second guide members 34 and 35 have a shape that is long in the extending direction E. The lengths of the first and second guide members 34 and 35 in the extending direction E are smaller than the length of the partition wall member 32 in the extending direction E. Both the first and second guide members 34 and 35 are disposed at positions closer to the bottom end portion 32c than the top end portion 32d.

As illustrated in FIG. 3 and FIG. 4, the cylinder head 2 includes a third groove portion 3c and a fourth groove portion 3d formed in the inner wall of the intake port 3. The third groove portion 3c is formed so as to extend in the extending direction E (direction in which the intake port 3 extends) from an opening upstream of the intake port 3 (opposite to the cylinder 1a), and has a shape corresponding to the first guide member 34. The length of the third groove portion 3c in the extending direction E is larger than the length of the first guide member 34 in the extending direction E. The size of a cross section of the third groove portion 3c perpendicular to the extending direction E is slightly larger than the size of a cross section of the first guide member 34 perpendicular to the extending direction E.

The fourth groove portion 3d is formed so as to extend in the extending direction E from an opening upstream of the intake port 3, and has a shape corresponding to the second guide member 35. The length of the fourth groove portion 3d in the extending direction E is larger than the length of the second guide member 35 in the extending direction E. The size of a cross section of the fourth groove portion 3d perpendicular to the extending direction E is slightly larger than the size of a cross section of the second guide member 35 perpendicular to the extending direction E.

As illustrated in FIG. 3 and FIG. 4, the first guide member 34 is inserted into the third groove portion 3c and thereby fixed to the third groove portion 3c, that is, the inner wall of the intake port 3. The second guide member 35 is inserted into the fourth groove portion 3d and thereby fixed to the fourth groove portion 3d, that is, the inner wall of the intake port 3. The partition wall member 32 is indirectly fixed to the inner wall of the intake port 3 by means of the first and second guide members 34 and 35, and the third and fourth groove portions 3c and 3d.

While the first guide member 34 is inserted in the third groove portion 3c, part of the first end portion 32a of the partition wall member 32 faces the third groove portion 3c and the first guide member 34 is interposed between the first end portion 32a of the partition wall member 32 and the third groove portion 3c. While the second guide member 35 is inserted in the fourth groove portion 3d, part of the second end portion 32b of the partition wall member 32 faces the fourth groove portion 3d and the second guide member 35 is interposed between the second end portion 32b of the partition wall member 32 and the fourth groove portion 3d. The position of the partition wall member 32 in the intake port 3 is defined by the third and fourth groove portions 3c and 3d.

As illustrated in FIG. 3 and FIG. 5, the partition wall 31 further includes a support member 33 interposed between the partition wall member 32 and the inner wall of the intake passage 4. In one embodiment, the support member 33 includes a first member 33a interposed between the first end portion 32a of the partition wall member 32 and the inner wall of the intake passage 4 and a second member 33b interposed between the second end portion 32b of the partition wall member 32 and the inner wall of the intake passage 4. The first and second members 33a and 33b are formed of an elastic body, for example, resin material or rubber. Hereinafter, a case where the first and second members 33a and 33b are formed of an elastic body will be described. In the following description, the first member 33a is referred to as a "first elastic body member 33a" and the second member 33b is referred to as a "second elastic body member 33b."

Both the first and second elastic body members 33a and 33b have shapes that are long in the extending direction E. The lengths of the first and second elastic body members 33a and 33b in the extending direction E are smaller than the length of the partition wall member 32 in the extending direction E. Both the first and second elastic body members 33a and 33b are disposed at positions closer to the top end portion 32d than the bottom end portion 32c.

As illustrated in FIG. 3 and FIG. 5, the intake manifold 40 includes a first groove portion 4c and a second groove portion 4d formed in the inner wall of the intake passage 4. The first groove portion 4c is formed so as to extend in the extending direction E (direction in which the intake passage 4 extends) from an opening downstream of the intake passage 4 (cylinder 1a side) and has a shape corresponding to the first elastic body member 33a. The length of the first groove portion 4c in the extending direction E is larger than the length of the first elastic body member 33a in the extending direction E. The size of a cross section of the first groove portion 4c perpendicular to the extending direction E may be slightly larger than the size of a cross section of the first elastic body member 33a perpendicular to the extending direction E and may be slightly smaller than the cross section of the first elastic body member 33a perpendicular to the extending direction E.

The second groove portion 4d is formed so as to extend in the extending direction E from an opening downstream of the intake passage 4 and has a shape corresponding to the second elastic body member 33b. The length of the second groove portion 4d in the extending direction E is larger than the length of the second elastic body member 33b in the extending direction E. The size of a cross section of the second groove portion 4d perpendicular to the extending direction E may be slightly larger than the size of a cross section of the second elastic body member 33b perpendicular to the extending direction E or may be smaller than the size of the cross section of the second elastic body member 33b perpendicular to the extending direction E.

As illustrated in FIG. 3 and FIG. 5, the first elastic body member 33a is inserted into the first groove portion 4c and thereby fixed to the first groove portion 4c, that is, the inner wall of the intake passage 4. Furthermore, the second elastic body member 33b is inserted into the second groove portion 4d and thereby fixed to the second groove portion 4d, that is, the inner wall of the intake passage 4. The partition wall member 32 is indirectly fixed to the inner wall of the intake passage 4 by means of the first and second elastic body members 33a and 33b, and the first and second groove portions 4c and 4d.

Note that particularly when the size of the cross section of the first groove portion 4c perpendicular to the extending direction E is smaller than the size of the cross section of the first elastic body member 33a perpendicular to the extending direction E and the size of the cross section of the second groove portion 4d perpendicular to the extending direction E is smaller than the size of the cross section of the second elastic body member 33b perpendicular to the extending direction E, the partition wall member 32 is fixed to the inner wall of the intake passage 4 with the first elastic body member 33a press-fitted to the first groove portion 4c and the second elastic body member 33b press-fitted to the second groove portion 4d.

While the first elastic body member 33a is inserted in the first groove portion 4c, part of the first end portion 32a of the partition wall member 32 faces the first groove portion 4c and the first elastic body member 33a is interposed between the first end portion 32a of the partition wall member 32 and the first groove portion 4c. While the second elastic body member 33b is inserted in the second groove portion 4d, part of the second end portion 32b of the partition wall member 32 faces the second groove portion 4d and the second elastic body member 33b is interposed between the second end portion 32b of the partition wall member 32 and the fourth groove portion 3d.

Next, a configuration and operation of the intake control valve 41 will be described with reference to FIG. 2 and FIG. 3. The intake control valve 41 includes a valve body 41a disposed in the intake passage 4 and a shaft 41b inserted through the intake passage 4. The shaft 41b is coupled to a rotation shaft of the motor 42. The valve body 41a has a plate-like shape and is fixed to the shaft 41b. Note that the valve body 41a is provided for each of the intake passages 4. When the plurality of intake passages 4 are in a line, one shaft 41b may be inserted through the plurality of intake passages 4 and the plurality of valve bodies 41a may be fixed to the one shaft.

The motor 42 causes the valve body 41a to rotate together with the shaft 41b. The flow rate of the intake gas passing through each of the first channel 3a and the second channel 3b of the intake port 3 can be adjusted by a posture of the valve body 41a. When the engine 1 is in a low-speed rotating condition and the amount of the intake gas is small, as illustrated in FIG. 2, the valve body 41a is caused to rotate to set the valve body 41a in a posture orthogonal to a direction in which the intake passage 4 extends. In this posture, the valve body 41a has such a shape as to block the intake gas flowing from upstream of the valve body 41a into the first channel 3a, but not to block the intake gas flowing from upstream of the valve body 41a into the second channel 3b. In this condition, most of the intake gas passes through the first channel 3a. As a result, the flow speed of the intake gas passing through the first channel 3a increases and the vortex flow (tumble flow) in the cylinder 1a is enhanced.

Though not illustrated in the drawings, when the engine 1 is in a high-speed rotating condition and the amount of the intake gas is large, the valve body 41a is caused to rotate from the condition illustrated in FIG. 2 to set the valve body 41a in a posture in the direction in which the intake passage 4 extends. In this condition, the intake gas is not blocked by the valve body 41a and passes through each of the first and second channels 3a and 3b to flow into the cylinder 1a.

Figure 6:
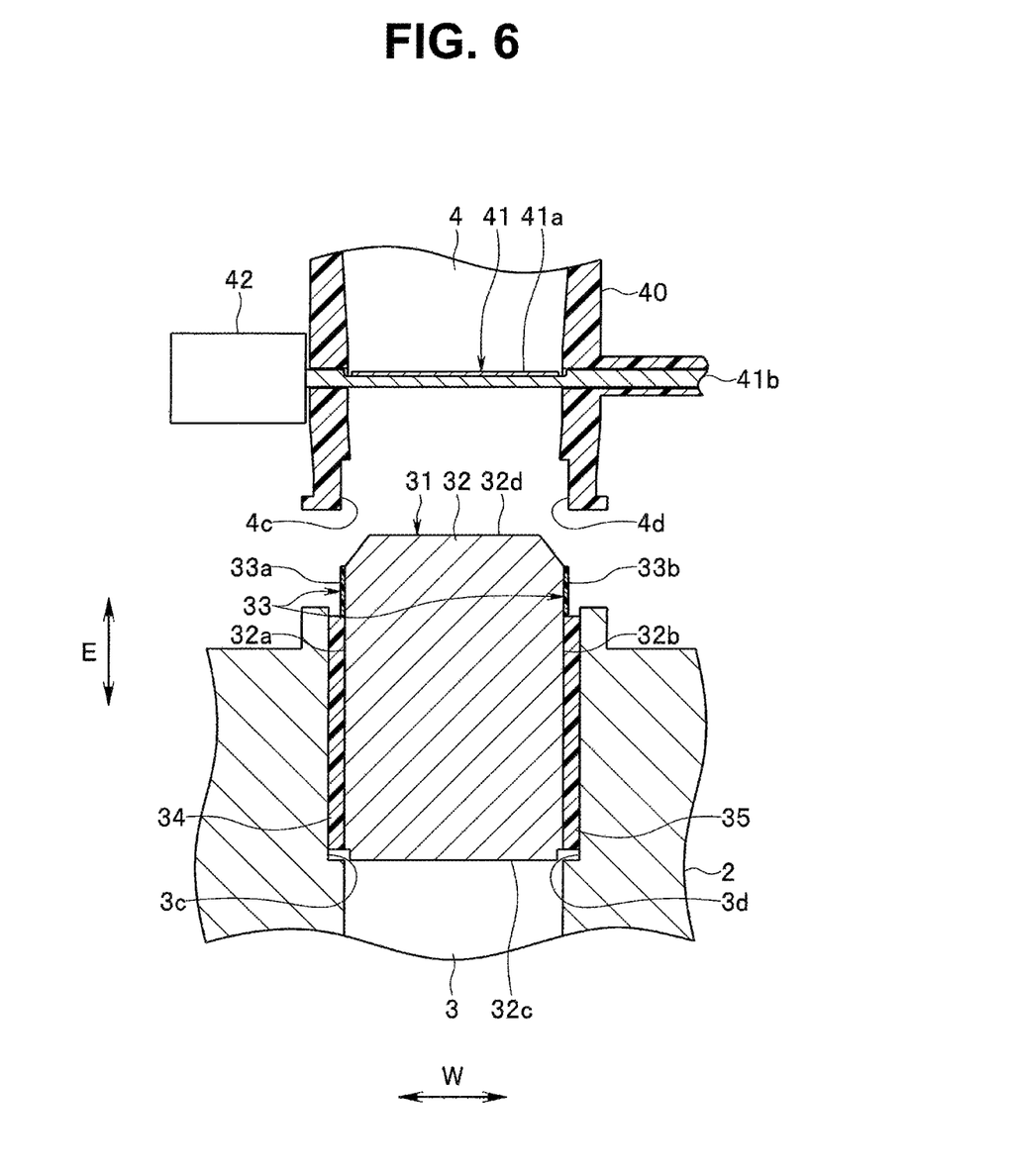
FIG. 6 is a cross-sectional view illustrating one of steps of manufacturing the engine according to the embodiment of the technology.

Next, of the manufacturing steps of the engine 1, a series of steps related to the partition wall 31 will be described briefly with reference to FIG. 6. FIG. 6 is a cross-sectional view illustrating one of steps of manufacturing the engine 1. In the above-described series of steps, a first step of assembling the partition wall 31 to the intake port 3 and a second step of assembling the intake manifold 40 to the cylinder head 2 after the first step are performed. FIG. 6 illustrates a state immediately before the second step.

In the first step, while the first guide member 34 of the partition wall 31 is inserted into the third groove portion 3c formed in the inner wall of the intake port 3 and the second guide member 35 of the partition wall 31 is inserted into the fourth groove portion 3d formed in the inner wall of the intake port 3, the partition wall 31 is inserted into the intake port 3. In this way, the partition wall 31 is assembled to the intake port 3.

In the second step, while the first elastic body member 33a of the partition wall 31 is inserted into the first groove portion 4c formed in the inner wall of the intake passage 4 and the second elastic body member 33b of the partition wall 31 is inserted into the second groove portion 4d formed in the inner wall of the intake passage 4 first, the intake manifold 40 is caused to come into contact with the cylinder head 2. Next, the intake manifold 40 is fixed to the cylinder head 2 using bolts (not illustrated).

Next, operations and effects of the engine 1 according to the present embodiment will be described. As described above, in the present embodiment, the partition wall member 32 of the partition wall 31 extends from the intake port 3 to the intake passage 4 and is fixed to the inner wall of the intake port 3 and the inner wall of the intake passage 4. According to the present embodiment, the partition wall member 32 can directly define a positional relationship between the intake port 3 and the intake passage 4. Thus, according to the present embodiment, the positional relationship between the intake port 3 and the intake passage 4 can be defined accurately. Hereinafter, this effect will be described in comparison with an engine according to a comparative example.

Figure 7:
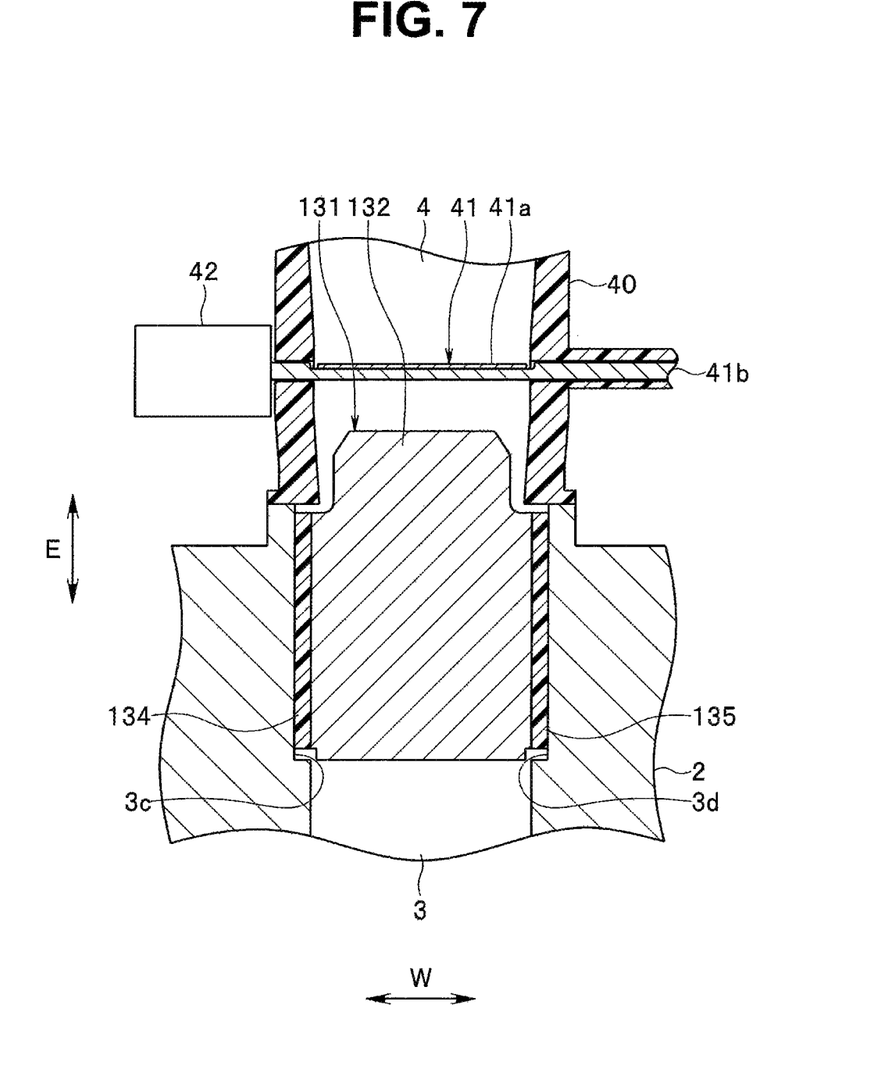
FIG. 7 is a cross-sectional view illustrating a cross section of part of an engine according to a comparative example.

FIG. 7 is a cross-sectional view illustrating part of an engine in the comparative example. The engine in the comparative example is provided with a partition wall 131 in the comparative example instead of the partition wall 31 in the present embodiment. As in the case of the partition wall 31 of the present embodiment, the partition wall 131 separates at least part of the intake port 3 into the first channel 3a and the second channel 3b. The partition wall 131 includes a partition wall member 132 extending from the intake port 3 to the intake passage 4. Although the partition wall member 132 is fixed to the inner wall of the intake port 3, it is not fixed to the inner wall of the intake passage 4. In the comparative example, the size in the width direction W of a portion of the partition wall member 132 located in the intake passage 4 is smaller than the size of the intake passage 4 in the width direction W. Therefore, the partition wall member 132 does not come into contact with the inner wall of the intake passage 4.

The partition wall 131 further includes guide members 134 and 135 provided at both ends of the partition wall member 132 in the width direction W. The guide members 134 and 135 have the same shapes as the first and second guide members 34 and 35 in the present embodiment. The guide member 134 is inserted into the third groove portion 3c formed in the inner wall of the intake port 3, the guide member 135 is inserted into the fourth groove portion 3d formed in the inner wall of the intake port 3, and the partition wall member 132 is thereby indirectly fixed to the inner wall of the intake port 3.

In the comparative example, neither the first groove portion 4c nor the second groove portion 4d is formed. The rest of the configuration of the engine in the comparative example is the same as the configuration of the engine 1 according to the present embodiment.

In the comparative example, the partition wall 131 is assembled to the intake port 3 in a step similar to the first step of the present embodiment, and the intake manifold 40 is then assembled to the cylinder head 2 using bolts (not illustrated). In the comparative example, the positional relationship between the intake port 3 and the intake passage 4 is defined by a position at which the intake manifold 40 is assembled.

Bolt holes through which the bolts are passed are formed in the intake manifold 40. The inner diameter of the bolt hole is somewhat larger than the diameter of the bolt. Thus, in the comparative example, when the intake manifold 40 is assembled to the cylinder head 2, a backlash in the intake manifold 40 may cause the intake manifold 40 to be shifted from a desired position. When the intake manifold 40 is shifted from the desired position, a step is produced between the intake port 3 and the intake passage 4, and as a result, the intake gas passing through the intake port 3 and the intake passage 4 is disturbed.

By contrast, in the present embodiment, as described above, the partition wall member 32 can directly and accurately define the positional relationship between the intake port 3 and the intake passage 4. In details, the second step can define the position of the intake passage 4 with respect to the partition wall member 32, and can thereby define the position of the intake passage 4 with respect to the intake port 3. Afterwards, even when the intake manifold 40 is fixed to the cylinder head 2 using the bolts, it is possible to maintain the positional relationship between the intake port 3 and the intake passage 4 defined by the partition wall member 32. Compared to the comparative example in which the positional relationship between the intake port 3 and the intake passage 4 is indirectly defined, it is possible to accurately define the positional relationship between the intake port 3 and the intake passage 4 according to the present embodiment. As a result, according to the present embodiment, it is possible to reduce the step between the intake port 3 and the intake passage 4, and stabilize the gas flow in the cylinder 1a.

In the present embodiment, the first and second groove portions 4c and 4d are formed in the inner wall of the intake passage 4. In this way, according to the present embodiment, compared to a case where none of the first and second groove portions 4c and 4d is formed, it is possible to more accurately define the position of the intake passage 4 with respect to the partition wall member 32, and as a result, more accurately define the position of the intake passage 4 with respect to the intake port 3.

In the present embodiment, the intake control valve 41 for enhancing a vortex flow (tumble flow) generated in the cylinder 1a is provided. As described above, the intake control valve 41 increases the flow speed of the intake gas passing through the first channel 3a of the intake port 3 and enhances the vortex flow in the cylinder 1a. According to the present embodiment, it is possible to reduce the step between the intake port 3 and the intake passage 4, and thereby prevent the intake gas passing through the first channel 3a from being disturbed, and as a result, stabilize the vortex flow in the cylinder 1a.

The technology is not limited to the aforementioned embodiment but various changes or modifications can be made without departing from the gist and scope of the technology. For example, the engine 1 may be provided with a mechanism for generating a swirl flow in the cylinder 1a instead of the mechanism for generating a tumble flow in the cylinder 1a. That is, the engine 1 may be provided with a plurality of partition walls and a plurality of intake control valves to generate a swirl flow instead of the plurality of partition walls 31 and the plurality of intake control valves 41.

The partition wall 31 may include a support member constituted by one member instead of the support member 33 including the first and second elastic body members 33a and 33b, which are separate members. The support member may include portions corresponding to the first and second elastic body members 33a and 33b.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An engine, comprising:
    a cylinder head comprising an intake port communicating with a combustion chamber;
    an intake manifold fixed to the cylinder head and comprising an intake passage communicating with the intake port;
    a partition wall separating at least a part of the intake port into a first channel and a second channel, the partition wall comprising a partition wall member extending in an extending direction from the intake port to the intake passage and fixed to an inner wall of the intake port and an inner wall of the intake passage;
    a first opposing pair of grooves formed on an inner surface of the intake port and extending along the extending direction; and
    a second opposing pair of grooves formed on an inner surface of the intake passage and extending along the extending direction,
    wherein, in an orthogonal direction to the extending direction, a width of the partition wall member is equal to or more than a width of the intake passage, and
    wherein the partition wall member fits into the first opposing pair of grooves and the second opposing pair of grooves at both ends in the orthogonal direction.

2. The engine according to claim 1, wherein the partition wall member comprises:
    a first pair of support members support member disposed on the both ends of the partition wall member in the orthogonal direction; and
    a second pair of support members disposed on the both ends of the partition wall member in the orthogonal direction,
    wherein the first pair of support members fits into the first opposing pair of grooves and the second pair of support members fits into the second opposing air of grooves.

3. The engine according to claim 2, wherein the first and second pair of support members comprise an elastic body.

4. The engine according to claim 1, further comprising an intake control valve configured to control a flow rate of an intake gas to pass through each of the first channel and the second channel.

5. The engine according to claim 4, wherein the intake control valve is configured to change a vortex flow generated in the combustion chamber.

6. An engine, comprising:
a cylinder head comprising an intake port;
an intake manifold attached to the cylinder head and comprising an intake passage communicating with the intake port; and
a partition wall separating at least a part of the intake port into a first channel and a second channel, the partition wall comprising a partition wall member extending in an extending direction from the intake port to the intake passage;
a first opposing pair of grooves formed on an inner surface of the intake port and extending along the extending direction; and
a second opposing pair of grooves formed on an inner surface of the intake passage and extending along the extending direction,
wherein, in a width direction orthogonal to the extending direction, an end portion of the partition wall member fits into the first opposing pair of grooves and the second opposing pair of grooves.

7. The engine according to claim 6, wherein the partition wall member comprises:
a pair of support members support member disposed on the both ends in the width direction of the partition wall member; and
a second pair of support members disposed on the both ends in the width direction of the partition wall member,
wherein the first pair of support members fits into the first opposing pair of grooves and the second pair of support members fits into the second opposing pair grooves.

8. An engine, comprising:
a cylinder head comprising an intake port, the intake port extending in a first direction;
an intake manifold attached to the cylinder head and comprising an intake passage communicating with the intake port, the intake passage extending in a second direction;
a first opposing pair of grooves formed on an inner surface of the intake port and extending along the extending direction;
a second opposing pair of grooves formed on an inner surface of the intake passage and extending along the extending direction; and
a partition wall member including a first plate portion located in the intake passage and a second plate portion located in the intake port, the first plate portion extending along the first direction, the second plate portion being integrally formed with the first plate portion and extending along the second direction,
wherein the first plate portion fits into the first opposing pair of grooves and the second plate portion fits into the second opposing pair of grooves.

9. The engine according to claim 8, wherein the partition wall member defines a position of the intake passage with respect to the intake port by:
the first plate portion being fitted into the first groove portion and the second groove portion; and
the second plate portion being fitted into a third groove portion and a fourth groove portion.

10. The engine according to claim 9, wherein the first plate portion separates at least a part of the intake port into a first channel and a second channel, and the second plate portion separates at least a part of the intake passage into a third channel and a fourth channel, and
wherein the first channel is continuous to the third channel and the second channel is continuous to the fourth channel.

11. The engine according to claim 3, further comprising:
a first pair of elastic bodies disposed on both ends of the first plate portion in a width direction orthogonal to the first direction; and
a second pair of elastic bodies disposed on both ends of the second plate portion in a width direction orthogonal to the second direction,
wherein the first plate portion fits into the first opposing pair of grooves at the first pair of elastic bodies and the second plate portion fits into the second opposing pair of grooves at the second pair of elastic bodies.

* * * * *